United States Patent

[11] 3,572,755

| [72] | Inventor | Harold C. Baldwin |
| | | 5225 E. Whitton, Phoenix, Ariz. 85018 |
| [21] | Appl. No. | 813,044 |
| [22] | Filed | Apr. 3, 1969 |
| [45] | Patented | Mar. 30, 1971 |

[54] RECESSED ROPE ANCHOR FOR TRUCK BODIES
2 Claims, 1 Drawing Fig.

[52] U.S. Cl. ................................................. 280/179,
24/115, 105/369, 248/361
[51] Int. Cl. .................................................... B60p 7/08
[50] Field of Search........................................ 280/179,
179 (1); 105/369 (A); 248/361, 361 (A); 24/115
(.8), 123 (.7), 129, 130, 230 (.1-m); 114/218

[56] References Cited
UNITED STATES PATENTS

| 1,168,982 | 1/1916 | Walker | 114/218(X) |
| 2,472,939 | 6/1949 | Connolly | 105/369(A) |
| 2,623,477 | 12/1952 | Tuttle | 105/369(A) |
| 2,702,513 | 2/1955 | Tuttle | 105/369(A) |
| 2,843,060 | 7/1958 | Sladek | 105/369(A) |
| 3,038,394 | 6/1962 | Brinker et al. | 105/369(A)X |
| 3,257,971 | 6/1966 | Swendsen | 105/369(A) |
| 3,334,914 | 8/1967 | Vierregger | 280/179(.1) |
| 3,345,711 | 10/1967 | McCarthy | 24/230(.1-m) |
| 3,427,996 | 2/1969 | Alvarados | 105/369(A) |

*Primary Examiner*—Benjamin Hersh
*Assistant Examiner*—Leslie J. Paperner
*Attorney*—Wm. H. Dean ABSTRACT: A recessed rope anchor for truck bodies, or the like, said anchor of generally cup-shaped form having a bolt receiving flange extending outwardly therefrom and a peg in a normally upper wall of the cup-shaped body and extending downward from the upper wall of the cup-shaped body into an open area thereof; said upper wall being relatively thicker than the lower wall of the cup-shaped body to provide a firm cantilever support for said peg.

PATENTED MAR 30 1971  3,572,755
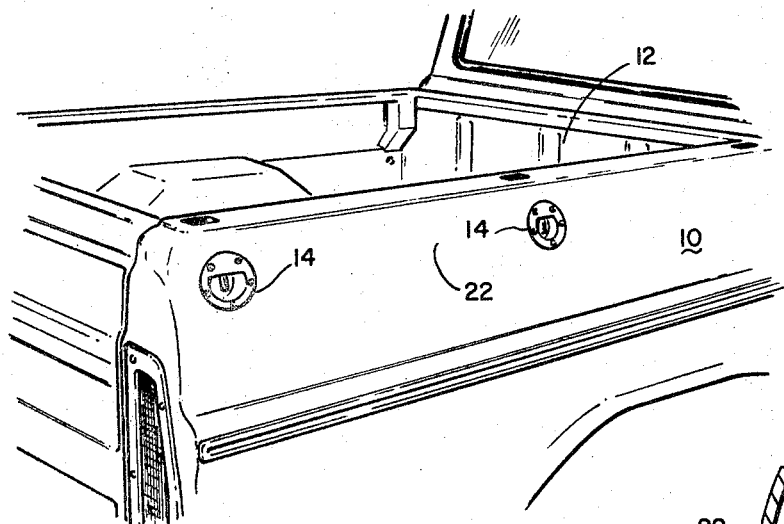
FIG. I.
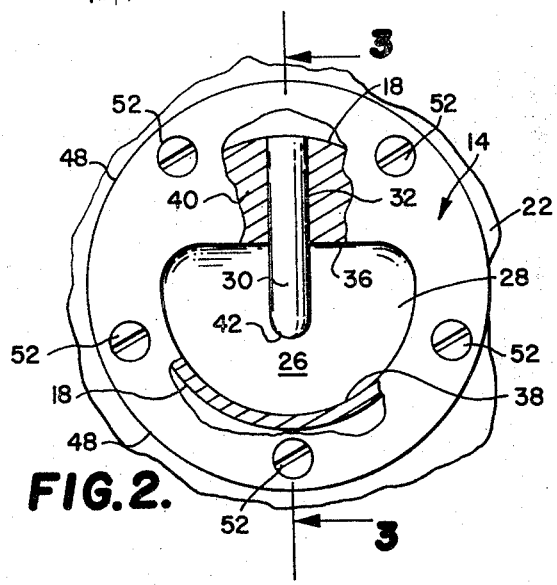
FIG. 2.
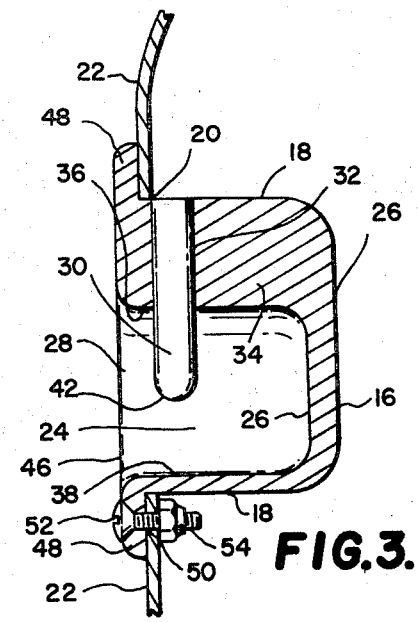
FIG. 3.
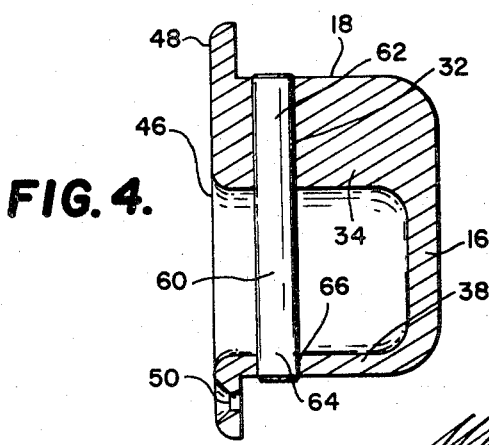
FIG. 4.
INVENTOR
HAROLD C. BALDWIN
BY
*Wm. H. Dean*

RECESSED ROPE ANCHOR FOR TRUCK BODIES

BACKGROUND OF THE INVENTION

Various rope anchors have been utilized for the purpose of engaging ropes at the sides of pickup truck bodies so that cargo may be tied down onto the bed of the truck body during transit to prevent tipping, swaying or movement of the cargo while being transported. Many of the anchors have been in the form of outwardly projecting hooks which extend substantially beyond the outer side surfaces of such truck bodies. Many of these have been objectionable from an aesthetic standpoint, and further tend to catch on various articles, such as tree limbs, or the like, when the truck is moving relative thereto. Additionally, many of these external hooks are so mounted that they do not afford substantial support for tie-down ropes and have a small area of support which may tend to deform the area of the truck body to which they are attached when substantial force is applied to such hooks.

SUMMARY OF THE INVENTION

The present invention relates to a recessed rope anchor for truck bodies, or the like, such as trailers, boats, etc., said anchor comprising a generally cup-shaped housing of generally circular form adapted to be inserted through a circular opening in the sidewall of a truck body. The cup-shaped housing having an open side directed outwardly toward the outer side of the truck body is also provided with surrounding outwardly directed flange adapted to receive several bolts extending over a substantially large area to insure substantial connection of the anchor with the outer side of the truck body, and also to provide an installation which does not having any hooks projecting beyond the outer surfaces of the truck body.

The invention comprises the foregoing cup-shaped housing structure having a normally upper wall supporting a downwardly directed rope-engaging peg in the interior of the housing and adjacent to an open side of the housing facing outwardly toward the outer side of the truck body, whereby ropes or other anchors may readily be secured to the peg in the housing to provide a very strong and secure connection for tie-down ropes or anchors.

The invention also comprises a novel recessed housing structure, wherein an upper wall portion of the housing is relatively thick compared to the lower wall of the housing portion, all of which is circular externally so that the opening facing outward of the housing is generally circular at the lower portion, and chordally disposed at the upper portion to provide a substantially thick upper wall of the housing in which the anchor peg of the invention is cantilever mounted, and therefore very securely mounted to withstand substantial stress, while a projecting end of the peg is terminated at an intermediate portion of the opening to allow facility for the placement of an anchor thereover, and therearound whether it be a rope or other suitable tie-down means.

According to a modification of the invention, the cup-shaped housing of the invention is provided with a peg extending vertically through both upper and lower walls of the hollow cup-shaped housing of the invention adjacent to the open side thereof so as to provide an extremely strong, heavy-duty-type of anchor in accordance with the invention.

Accordingly, it is an object of the present invention to provide a recessed anchor for truck bodies which comprises a tie-down rope engaging peg recessed inwardly relative to the outer side of the truck body.

Another object of the invention is to provide a recessed rope anchor for truck bodies which is very attractive aesthetically.

Another object of the invention is to provide a recessed rope anchor for truck bodies which is very strong and has widely distributed connection flange means adapted to distribute tie-down loads over a substantial area of the side of the truck body to prevent distortion thereof, where the extreme force is applied to the anchor.

Another object of the invention is to provide a recessed rope anchor for truck bodies which is circular and readily adapted to be installed in circular openings which are easy to form in the sidewalls of truck bodies.

Another object of the invention is to provide a recessed rope anchor for truck bodies which is very simple and easy to install, economical, very durable and attractive.

Other objects and advantages of the invention may be apparent from the following specification, appended claims, and accompanying drawings:

BRIEF DESCRIPTION OF THE DRAWINGS

FIG. 1 is a fragmentary side elevational view of a pickup truck bed showing a plurality of recessed rope anchors of the invention installed in connection with said truck bed;

FIG. 2 is an enlarged outer side elevational view of one of the recessed rope anchors in accordance with the invention shown in connection with fragmentary portion of the sidewall of a truck bed;

FIG. 3 is a sectional view taken from the line 3—3 of FIG. 2, showing parts and portions in elevation to facilitate the illustration; and FIG. 4 is a view similar to FIG. 3, showing a modification of the invention.

DESCRIPTION OF THE PREFERRED EMBODIMENTS

As shown in FIG. 1 of the drawings, the pickup truck bed 10 is provided with a cargo space 12 in which cargo may be carried, and wherein cargo is oftentimes tied down to prevent the cargo from shifting or tipping during transportation. In order to tie the cargo down, it is necessary to anchor ropes to the truck bed, and to thereby stabilize the load or cargo in the truck bed so that when the truck is moved over rough terrain or around corners, the cargo does not shift and become displaced or tipped over.

Accordingly, the invention comprises a plurality of recessed rope anchors 14 in connection with the sidewall of the truck bed 10. These anchors 14 being shown in detail in FIGS. 2 and 3 of the drawings.

The recessed rope anchor of the invention generally includes a hollow cup-shaped anchor housing 16 having an annular peripheral portion 18 adapted to be fitted into a circular opening 20 in a pickup truck bed sidewall 22. The cup-shaped anchor housing 16 is provided with a hollow cup-shaped recess 24 having a generally enclosed innner side 26 and an open outer side 28 adapted to permit the insertion of a rope or other tie-down member in connection with a peg 30 which is securely fitted in an opening 32 in an uppermost sidewall 34 of the hollow cup-shaped housing 16. It will be seen that the uppermost wall 34, even though its outer portion is arcuate, its inner portion 36, shown best in FIG. 2, is chordally disposed relative to an arcuate inner surface 38 of the interior of the cup-shaped housing 16. The chordal disposition of the inner wall 36 provides for a relatively thick uppermost wall portion 40 in which the peg 30 is mounted in cantilever fashion to afford a very substantial cantilever support for the peg 30. The peg 30 being preferably pressed tight into the opening 32 extending through the uppermost wall 34. A normally lower end 42 of the peg extends substantially halfway between the inner wall portions 36 and 38 to an intermediate portion in the open area of the cup-shaped housing 16 and closely adjacent an outer side 46 of the housing which is provided with an annular flange 48 projecting substantially beyond the circular perimeter 18 of the housing 16. The flange 48 is provided with a plurality of openings 50 extending therethrough, said openings 50 being adapted to receive bolts 52 which are adapted to extend through aligned and corresponding openings in the sidewall 22 of the truck body, and lock nuts 54 may be secured to the inner sides of the truck body sidewalls for holding the flange 48 securely in connection with the sidewall of the truck body. It will be understood that the flange 48 surrounding the housing 16 is of sufficient area to distribute stress evenly throughout a large area on the side of the truck body sidewall, and to thereby provide for considerable hold down stress resistance without deforming the sidewall of the truck body.

It will be understood that the peg 30, as shown in FIG. 3, which is a part of each recessed rope anchor of the invention, is recessed so that it does not tend to catch on various articles externally of the truck bed, as the truck passes through brush or other areas, and that the aesthetic features of the anchor of the invention are very attractive, as well as being highly utilitarian.

It will be seen that the end 42 of the peg 30 is substantially spherical in shape and very smooth to facilitate the placement of a rope or other hold down means therearound and thereover during the tying or anchoring of cargo in the truck bed 12.

In the modification, as shown in FIG. 4 of the drawings, the housing 16 is similar to that disclosed in FIGS. 2 and 3, and a modified peg 60 is provided with an upper end portion 62 secured in the opening 32, hereinbefore described, and the peg 60 is provided with a normally lower end 64 extending through an opening 66 in the lower wall portion 38 of the housing 16. It will be appreciated that the modified structure, shown in FIG. 4, is designed for great stress since the peg 16 is not cantilever supported, but supported in double shear in the upper and lower wall portions 34 and 38 of the housing 16.

It will be obvious to those skilled in the art that various modifications of the invention may be resorted to within the spirit of the invention.

I claim:

1. In a recessed rope anchor, the combination of; a generally cup-shaped anchor housing having an open side provided with a rope-receiving opening adapted to be mounted in close proximity to an outer side of a truck body, or the like, said cup-shaped housing having a flange directed away from said housing and disposed at said open side thereof, said flange having bolt-receiving openings therethrough and said flange adapted to be bolted contiguous to a side of a truck body, or the like, and said cup-shaped housing projecting from said flange in a direction to said open side and said housing being generally circular and adapted to extend through a circular opening in said truck body, or the like, said cup-shaped housing having a normally uppermost housing wall portion provided with a peg-receiving opening therein; a smooth rope-engaging peg securely and tightly mounted in said peg-receiving opening in said uppermost wall portion, said peg having an end extending downwardly to an intermediate area of said rope-receiving opening, said peg being adjacent said open side and in said opening, a lower portion of said opening being arcuate and an upper portion of said opening being disposed generally chordal with respect to said circular housing, whereby said uppermost wall portion is relatively thick as compared to a lower wall portion of said housing, said uppermost wall portion thus providing a substantial cantilever support for said peg.

2. The invention, as defined in claim 1, wherein: said end of said peg disposed in an intermediate area of said rope-receiving opening being generally curved and smooth to facilitate the placement of a rope or other anchor member over and behind said end of said peg.